United States Patent [19]
Schwert

[11] Patent Number: 5,984,582
[45] Date of Patent: Nov. 16, 1999

[54] METHOD OF EXTRACTING A HOLLOW UNIT LAID IN THE GROUND

[76] Inventor: Siegfried Schwert, Nieritzweg 1, D-14165 Berlin, Germany

[21] Appl. No.: 08/875,935
[22] PCT Filed: Nov. 20, 1995
[86] PCT No.: PCT/DE95/01658
 § 371 Date: Oct. 8, 1997
 § 102(e) Date: Oct. 8, 1997
[87] PCT Pub. No.: WO96/24794
 PCT Pub. Date: Aug. 15, 1996

[30] Foreign Application Priority Data

Feb. 10, 1995 [DE] Germany .......................... 195 05 517

[51] Int. Cl.⁶ .................................. E02F 5/10; B66C 1/46
[52] U.S. Cl. .......................... 405/184; 405/154; 405/156; 138/97; 138/98; 294/98.1
[58] Field of Search ..................................... 405/154, 156, 405/184; 138/97, 98; 156/287, 294; 294/98.1, 66.1

[56] References Cited

U.S. PATENT DOCUMENTS

| | | |
|---|---|---|
| 3,661,358 | 5/1972 | Dill ...................................... 405/154 X |
| 4,006,521 | 2/1977 | Pedone ................................ 405/184 X |
| 4,006,930 | 2/1977 | Cawley et al. ........................... 294/98.1 |
| 4,720,211 | 1/1988 | Streatfield et al. ...................... 405/154 |
| 4,770,562 | 9/1988 | Muller et al. ............................. 405/154 |
| 4,777,984 | 10/1988 | Storah ........................................ 138/98 |
| 5,173,009 | 12/1992 | Moriarty .................................. 405/154 |
| 5,174,684 | 12/1992 | Keener et al. ........................... 405/154 |
| 5,184,919 | 2/1993 | Smet ........................................ 405/154 |
| 5,282,696 | 2/1994 | Solomon et al. ........................ 405/184 |
| 5,545,449 | 8/1996 | Tiedeman ................................ 428/34.2 |
| 5,653,554 | 8/1997 | Preston et al. ........................... 405/154 |
| 5,706,861 | 1/1998 | Wood et al. ................................ 138/98 |

FOREIGN PATENT DOCUMENTS 1238578  7/1971  United Kingdom .

Primary Examiner—David Bagnell
Assistant Examiner—Jong-Suk Lee
Attorney, Agent, or Firm—Marshall & Melhorn

[57] ABSTRACT

Disclosed is a method of extracting a hollow member laid in the earth, e.g. a lead pipe, which is accessible at both its open ends. For this purpose a hose which may be internally pressurized, is introduced in an unpressurized condition into the pipe, the hose is then internally pressurized, pressing the hose against the internal wall of the pipe, and then, maintaining the internal pressure, the pipe is extracted from the earth in its longitudinal direction by means of the hose without axial movement between these two. In this way rupture of the lead pipe during extraction is avoided. Behind the rear end of the lead pipe in the direction of extraction, a new pipe can be coupled to the hose or to the lead pipe to be extracted, and which is introduced into the earth simultaneously with extraction of the lead pipe. An additional traction element can be introduced together with the hose into the pipe, which is pressed against the inner wall of the pipe by the hose which is internally pressurized, and which is used either alone or in conjunction with the hose to extract the pipe.

14 Claims, 6 Drawing Sheets

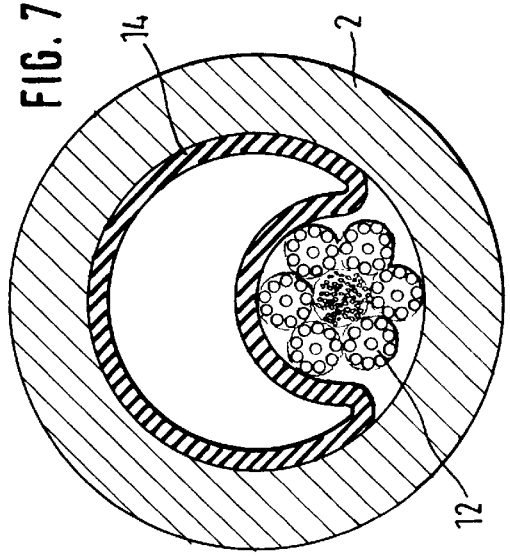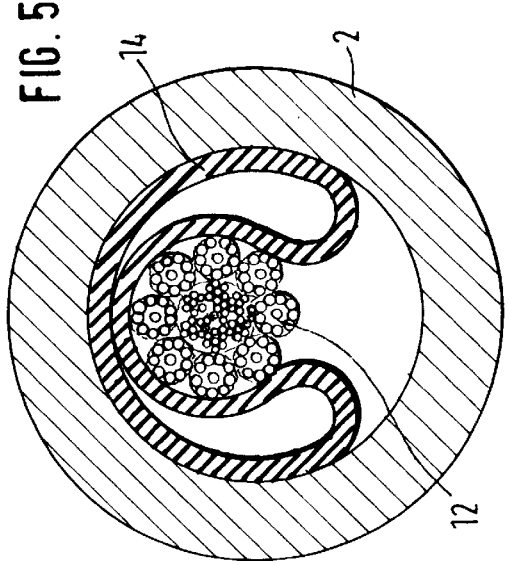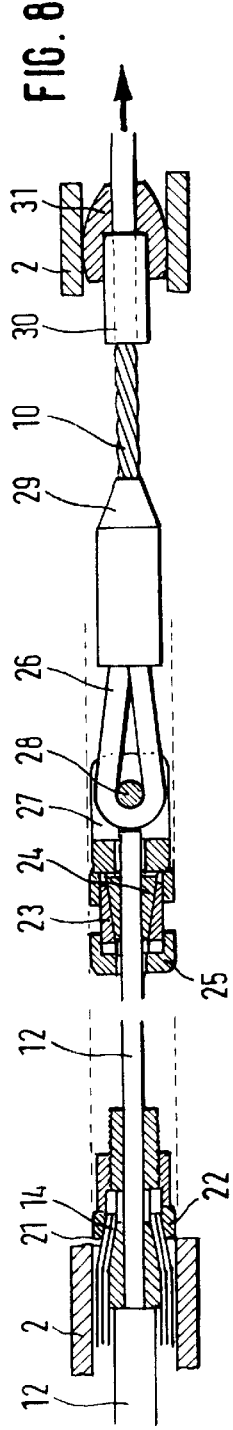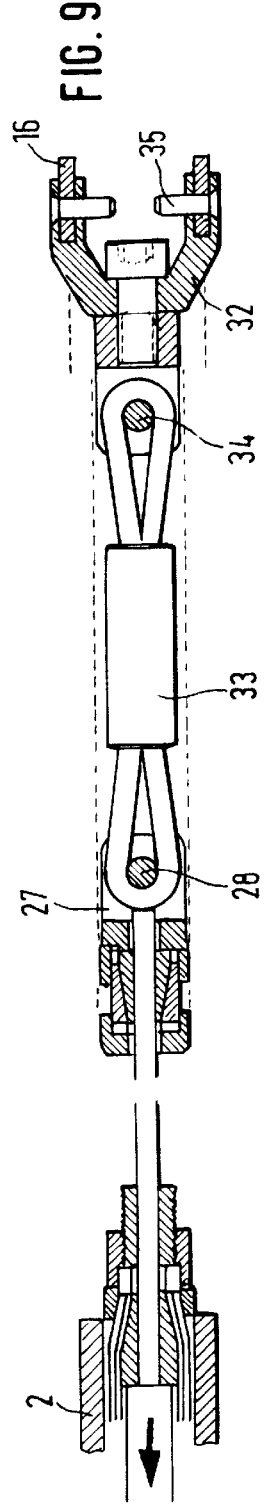

METHOD OF EXTRACTING A HOLLOW UNIT LAID IN THE GROUND

BACKGROUND OF THE INVENTION

The invention relates to a method of extracting a hollow member laid in the earth.

Pipes, for example for conducting drinking water, can become leaky after decades of use, or have other drawbacks, so that it becomes necessary to replace them by new pipes. Such pipes for domestic connections consisted in the past, among other materials, also of lead. Therefore it is also appropriate or even prescribed for health and environmental reasons to replace the lead pipes by pipes of another material, preferably polyethylene (PE). For this purpose the lead pipes should be withdrawn from the earth and the new pipes inserted into the earth in their place. When however the front end of the lead pipe is connected to a traction element and then attempts are made to withdraw the lead pipe, due to the low tensile strength of the lead it is unavoidable that the pipe will immediately rupture. Again, it is not possible to force the lead pipe out of the earth by connections at the rear end, as it is not sufficiently pressure-resistant, and would immediately deform.

SUMMARY OF THE INVENTION

It is therefore the object of the present invention to indicate a method of extracting a hollow member laid in the earth, which is accessible at both its open ends, in which neither rupture nor deformation of the hollow member occur.

This object is achieved according to the invention by the features indicated in the characterizing part of claim 1. Advantageous further developments of the method according to the invention will become apparent from the secondary claims.

By virtue of the fact that a hose, which may be pressurized by an internal pressure, is introduced in the unpressurized state into the hollow member over at least a portion of its length, that the hose is internally pressurized, pressing against the internal wall of the hollow member with an internal pressure, and then that, maintaining the internal pressure, the hollow member is withdrawn from the earth by means of a frictional and positive connection in its longitudinal direction by means of the hose itself and/or by means of a traction element introduced into the hollow member along with the hose, said traction element being pressed by the internal pressurization of the hose against the internal wall of the hollow member, the necessary tension is exerted over the entire length of the hose introduced into the hollow member, so that rupture of the hollow member is excluded.

The hose and if necessary the traction element preferably have an extensibility in the longitudinal direction which is greater than the extensibility of the hollow member. Therefore the hose is expanded at the beginning of the traction procedure. This achieves a situation in which the pipe is not suddenly set in motion all at once over its entire length, but the movement begins at the traction end of the hollow member and then progresses, expanding the hollow member, or opening any sleeve connections which may be present, over its entire length as far as the other end. In this way the tensile forces necessary to set the hollow member in motion can be considerably reduced. In order to achieve this effect, it may also be sufficient to provide the hose only with sections spaced apart in the longitudinal direction, and whose extensibility in the longitudinal direction corresponds to that of the pipe.

Should the tensile forces transmissible over the hose not be sufficient, it is recommended to introduce into the hollow member, along with the hose, a traction element, said traction element being pressed against the internal wall of the hollow member by means of internal pressurization of the hose, and being used in this condition in order to extract a hollow member.

There is preferably coupled, behind the rear end in the extraction direction of the hollow member, a new hollow member, which is simultaneously drawn into the earth along with extraction of the hollow member. Thus extraction of the old hollow member and introduction of the new hollow member take place in one working step.

The hose and if necessary the traction element are advantageously introduced into the hollow member by means of a pull-in cable, the hose and if necessary the traction element on the one hand and the pull-in cable being capable of being connected together by means of an adapter. In this case the adapter, during introduction of the hose and if necessary of the traction element, can expand the interior of the hollow member, calibrate it and/or smooth it, so that introduction of the following hose and if necessary traction element is simplified.

BRIEF DESCRIPTION OF THE DRAWINGS

The invention will be described in more detail in the following with reference to an embodiment given by way of example and shown in the Figures, which show.

DESCRIPTION OF THE PREFERRED EMBODIMENTS

Figure 1:
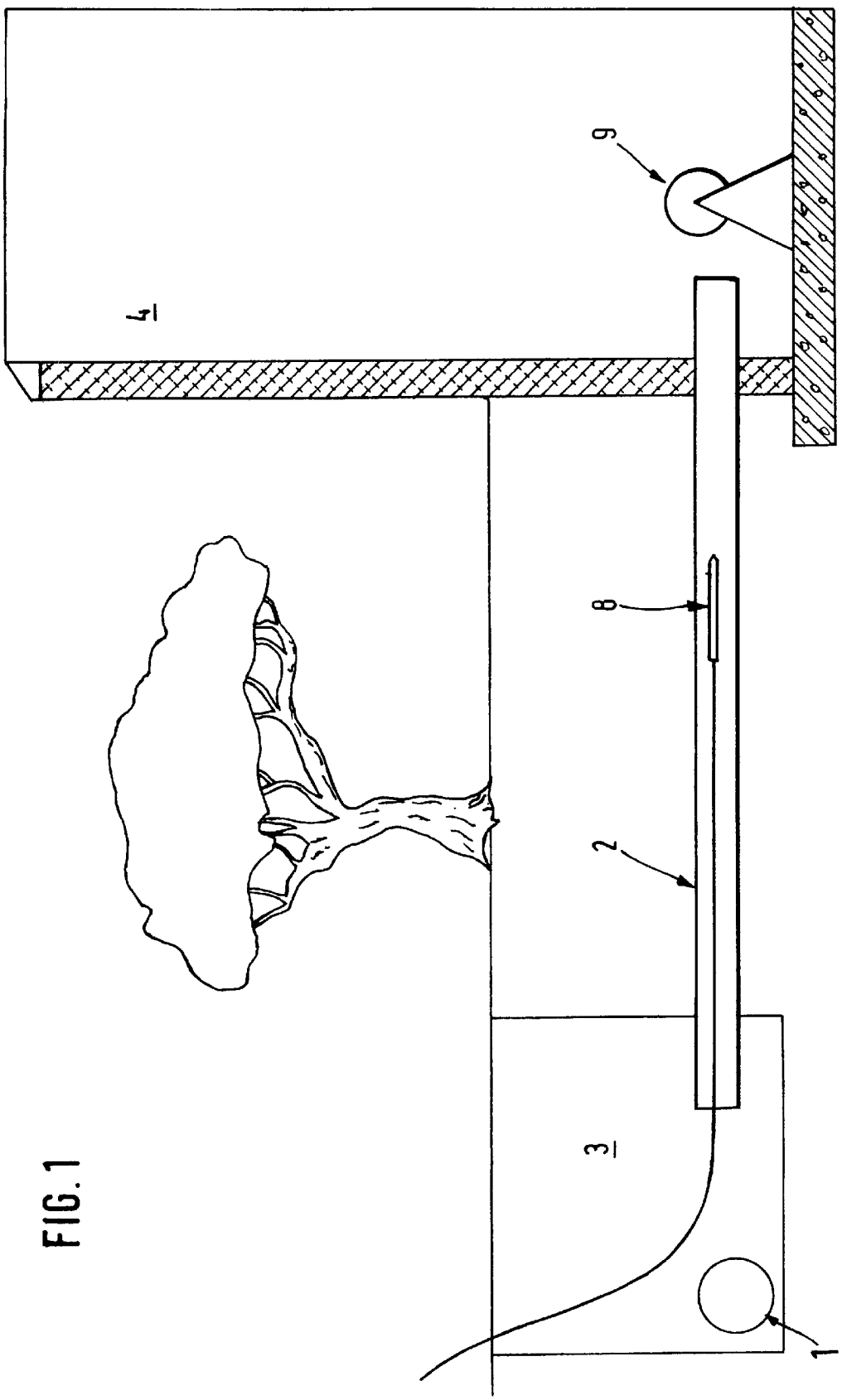
FIG. 1 a first method step in exchanging a lead pipe for a polyethylene pipe, FIG. 2 a second method step in exchanging a lead pipe for a polyethylene pipe, FIG. 3 a third method step in exchanging a lead pipe for a polyethylene pipe, FIG. 4 a fourth method step in exchanging a lead pipe for a polyethylene pipe, FIG. 5 the lead pipe in cross-section with the traction cable introduced and the hose unpressurized, FIG. 6 a pipe in cross-section with an introduced high-tensile hose in positive and frictional connection with the inner side of the pipe by means of internal pressure, FIG. 7 the lead pipe in cross-section with the traction cable introduced and the hose pressurized, FIG. 8 the coupling of traction cable and hose to the pull-in cable during introduction into the lead pipe, and FIG. 9 the coupling between traction cable and lead pipe as well as polyethylene pipe during extraction of the lead pipe and introduction of the polyethylene pipe.

In the area of a drinking water supply pipe 1, when a domestic connection pipe in the form of a lead pipe 2 is to be removed, a ditch 3 is excavated with a base area of for example 1.50 m×0.80 m. The lead pipe 2 leading into the cellar of a house 4 and having a length between about 6 and 25 m, is separated in the ditch 3 from the mains pipe 1 and in the cellar of the house 4 from the domestic pipe. A reamer 8 is pushed into the lead pipe 2, which is accessible at both open ends, from the ditch 3 into the cellar of the house 4. In this latter there is a cable drum 9 with a wound-up pull-in cable 10. This latter is attached to the reamer 8, and pulled through the lead pipe 2 towards the ditch 3.

Figure 2:
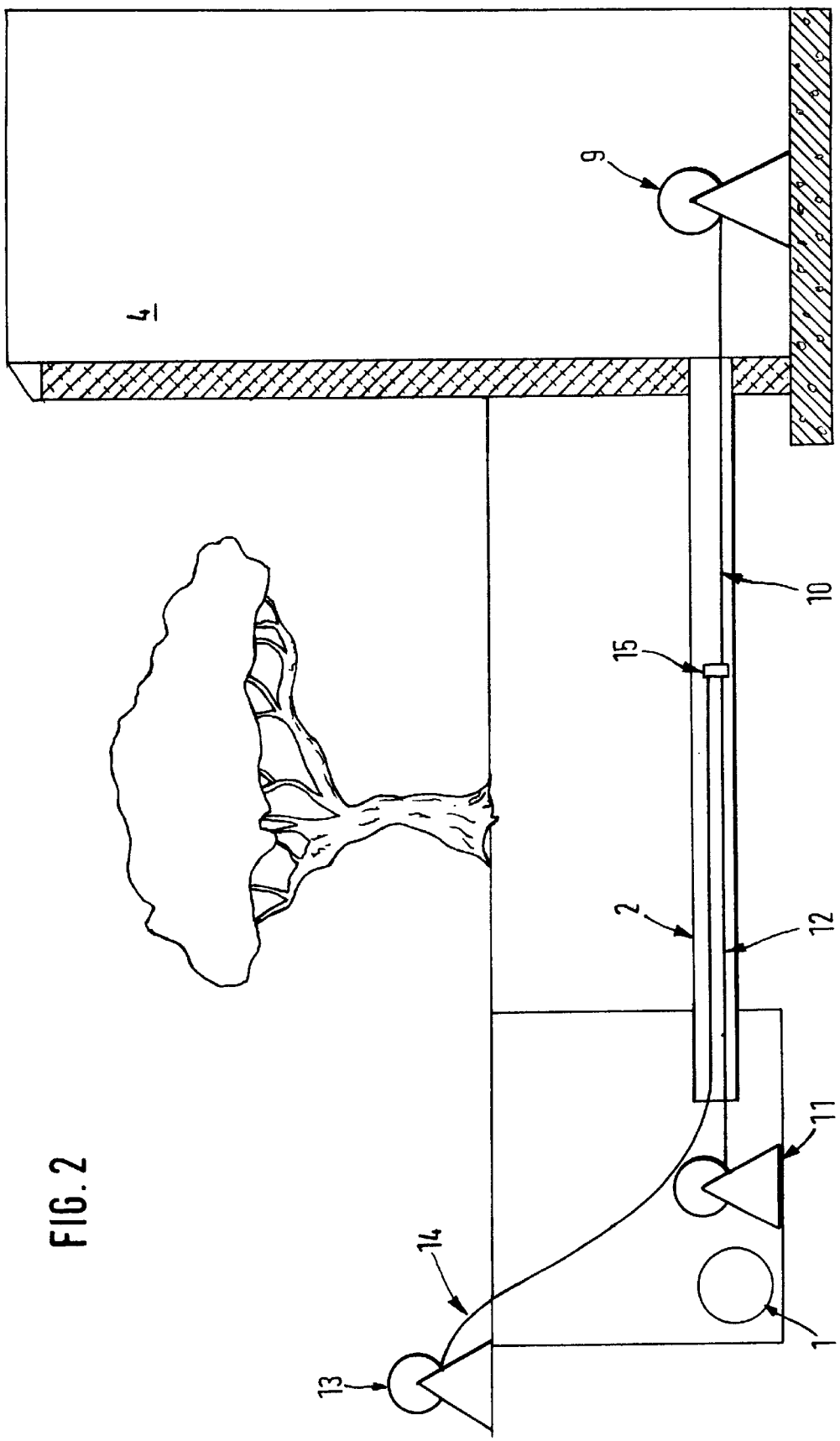

For the following method step indicated in FIG. 2, a cable drum 11 with a wound-up traction cable 12 is installed in the ditch. The traction cable 12 may also be a rod or a chain. For reasons of space, a hose drum 13, with a wound-up high-strength hose 14, is set up above the ditch 3. The hose drum 13 is provided with a rotary transmission lead-through, through which a liquid or a gas can be passed into the hose 14 from an external source. Through an adapter 15, which also closes the free end of the hose 14 in a pressure-tight manner, this adapter and the traction cable 12 are coupled to the end of the pull-in cable 10 projecting into the ditch 3, and drawn by the pull-in cable 10 into the cellar of the house 4. The adapter is so designed, or has such a diameter that, during its passage through the lead pipe 2, it expands and/or calibrates its interior and cleans and smooths its internal wall, so that introduction of the hose 14 following it is simplified.

Figure 3:
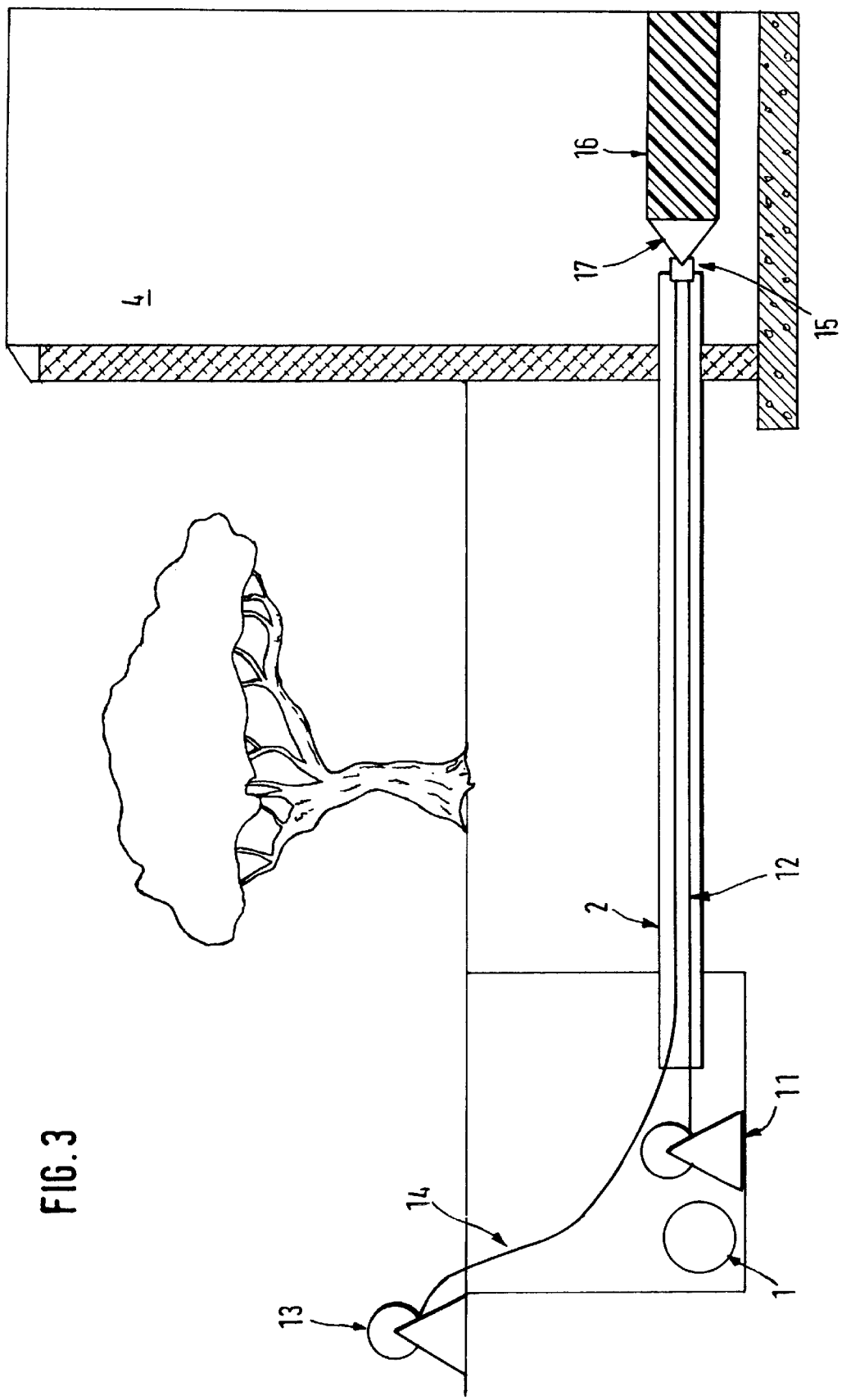

In the method step according to FIG. 3, after the pull-in cable 10 has been separated, a polyethylene tube 16 to be introduced is coupled to the adapter 15 in the cellar of the house 4. If the polyethylene tube 16 has a greater nominal width than the lead pipe 2, then an expander head 17 is placed between the adapter 15 and the polyethylene pipe 16, or the adapter is constructed as an expander head.

Figure 4:
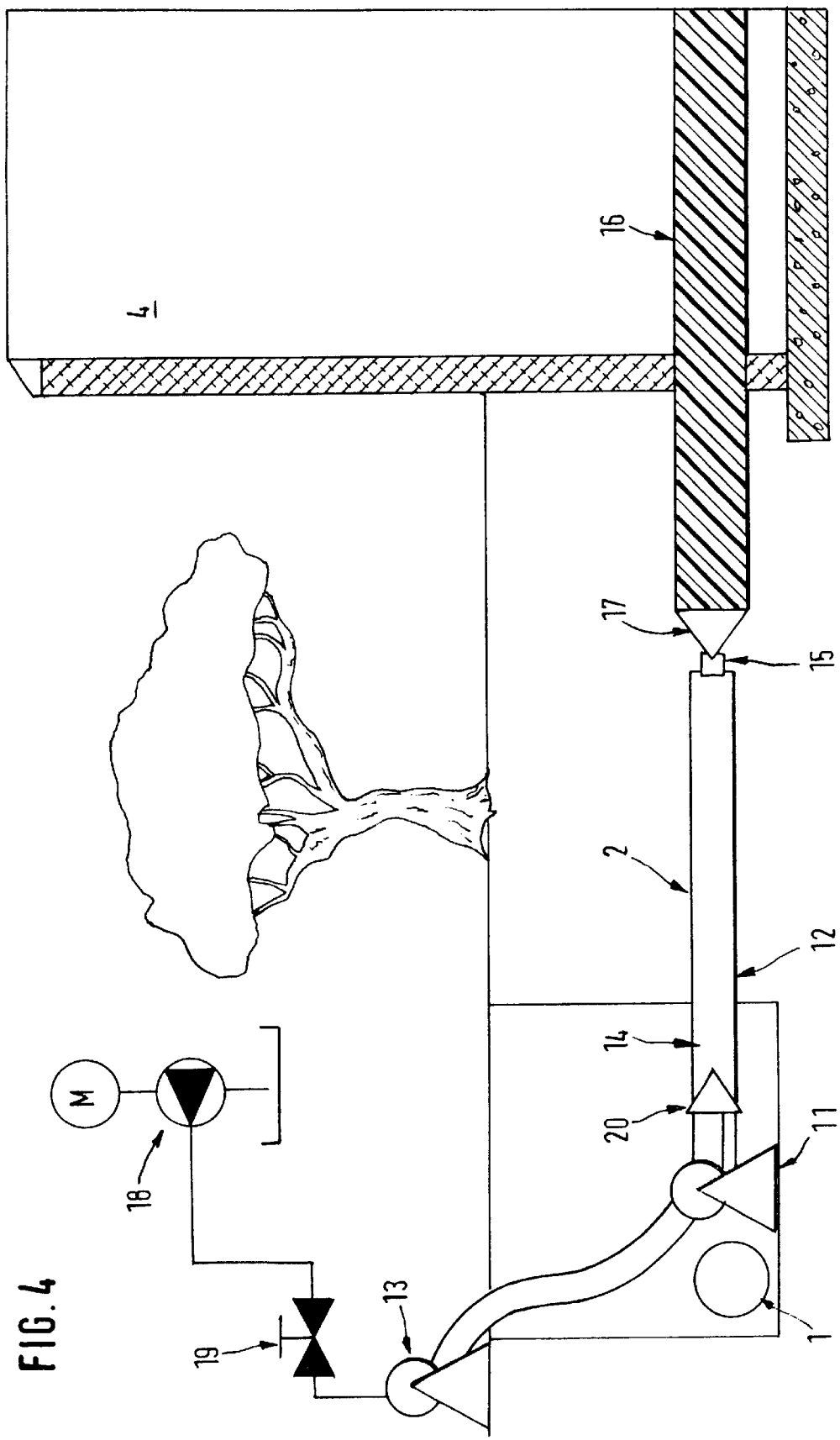

As FIG. 4 shows, the hose 14 is now filled by a motor-driven hydraulic pump 18 through a valve 19 and the rotary transmission lead-through of the hose drum 13 with a liquid such as water, and placed under sufficient internal pressure so that the traction cable 12 is securely pressed against the inner wall of the lead pipe 2. Then the traction cable 12 is withdrawn from the cable drum 11, frictional and positive connection resulting from the high pressure of the traction cable 12 applied against the internal wall of the lead pipe 2 over its entire length by means of which the tensile force is uniformly introduced into the lead pipe 2. Therefore the lead pipe, during withdrawal of the traction cable 12, is carried along with it, so that no local load peaks occur in the lead pipe 2, so that there is no risk of rupture. Simultaneously the polyethylene pipe 16 coupled by the expander head 17 to the adapter 15 is drawn into the cavity left behind by the lead pipe 2 and expanded by the expander head 17.

There is installed in the ditch 3, in the direction of the lead pipe 2 in front of the cable drum 11, a cutter device 20, which is for example designed as a cutter sleeve with blades or cutter rollers, and splits the pipe 2 in the longitudinal direction, so that it can be separated from the traction cable 12 and from the hose 14. The traction cable 12 can then be wound on to the cable drum 11, and the hose 14 on to the hose drum 13, the pressure in hose 14 being maintained. The cable drum 11 and the hose drum 13 are provided for this purpose with appropriate drive systems, so that the tension necessary for extracting the lead pipe 2 and introducing the polyethylene pipe 16 is also applied by the cable drum 11. The hose 14 with the traction cable 12 and the lead pipe 2, which may be undamaged, can be wound up in common on to the cable drum 11. After the lead pipe 2 has been entirely extracted from the earth and the polyethylene pipe 16 correspondingly introduced as far as the ditch 3, after the hose 14 has been depressurized, the traction cable 12 and the hose 4, which are connected by the adapter 15, can be separated from one another and the cable drum 11 and hose drum 13 can be transported to their new point of use.

FIGS. 5 and 7 show the lead pipe 2 with introduced traction cable 12 and hose 14 in cross-section, the hose 14 in FIG. 5 being unpressurized, and filled with liquid in FIG. 7, and held under a predetermined internal pressure. Due to this internal pressure of the hose 14, the traction cable 12 is pressed against the internal wall of the lead pipe 2, so that a frictional and positive connection exists between these two. The level of necessary internal pressure in the hose 14 depends on the force per length unit necessary to withdraw the lead pipe 2. This is among other things dependent on the diameter of the lead pipe 2, on the load applied by the earth above and the ground properties or the frictional value between the earth and the lead pipe, and the coefficient of friction between lead pipe and traction cable.

Figure 6:
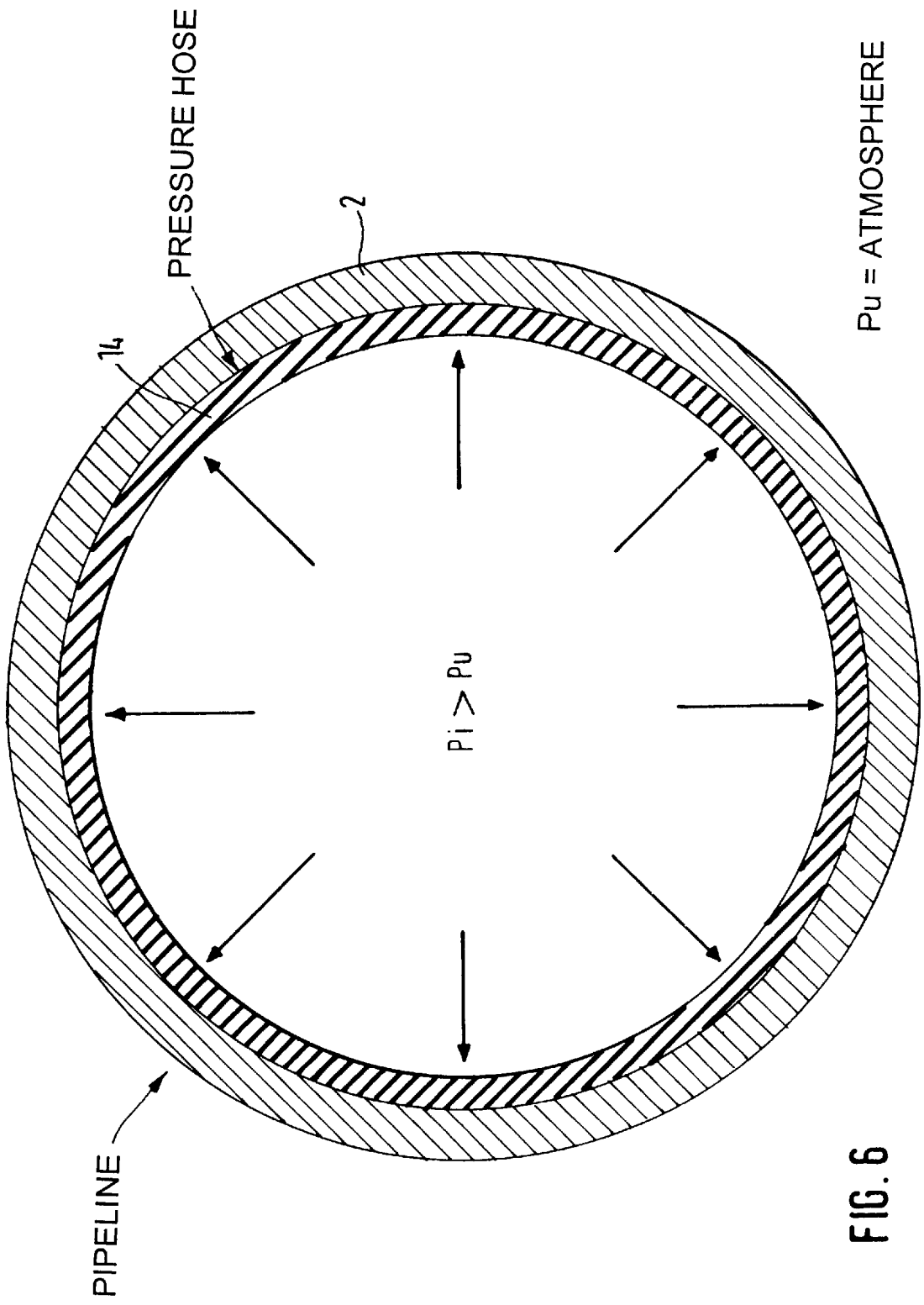

FIG. 6 shows use without an additional traction element, i.e. with only the tensile hose 14 with internal pressurization. In this case the hose 14 is deformed by the internally applied pressure in such a way that it is pressed against the internal pipe wall. Thus a frictional and positive connection is brought about. FIG. 8 shows the coupling mechanism of adapter 15 between the Full-in cable 10 and the traction cable 12 and hose 14, when these are introduced into the lead pipe 2. This condition corresponds to the method step illustrated in FIG. 2.

The hose 14 is folded together at the end and is pressed together between two cones 21 and 22, so that it is closed in a hydraulically tight or gas-tight manner. In the traction cable 12, the outer strands are separated and hard soldered at the end. For coupling with the pull-in cable 10, only the inner strands are used, which have sufficient tensile strength for introduction of the polyethylene pipe 16. The inner strands of the traction cable 12 are held by three clamp wedges 24, located next to one another in the circumferential direction, and pressed into a cone 23. A union nut 25 is provided for loosening the clamp wedges 24. The end of the pull-in cable 10, formed into a loop 26, is connected to the traction cable 12 by a fork 27, which is screwed to the cone 23 and in which a bolt 28 is accommodated. A pressure sleeve 29 serves to form the loop 26. A further pressure sleeve 30 located on the pull-in cable 10 carries a calibrating mandrel 31, which is intended to remove any deformations or constrictions in the lead pipe 2 and to free its internal surface of deposits, and to smooth it as well as if necessary to expand the cross-section of the lead pipe 2.

FIG. 9 shows the coupling mechanism or adapter 15 between the traction cable 12 and the polyethylene pipe 16, when the lead pipe 2 is being withdrawn and the polyethylene pipe 16 being introduced, i.e. during the method step shown in FIG. 4. After the coupling mechanism shown in FIG. 7 has been drawn by the pull-in cable 10 into the cellar of the house 4, the pull-in cable 10 with calibrating mandrel 31 is uncoupled by loosening the bolt 28, and a puller head 32 for the polyethylene pipe 16 is bolted to the fork 27. The connection between the fork 27 and the puller head 32 is brought about by a slip connector 33, secured at both ends by bolts 28 and 34. The puller head 32 is designed as an expander head, i.e. its external diameter is greater than that of the lead pipe 2. In this way it is possible for example to replace a lead pipe with an external diameter of 36 mm by a polyethylene pipe with an external diameter of 44 mm. The polyethylene pipe 16 is attached to the puller head 32.

The embodiments described relate to a method for extracting a pipe 2, laid in the earth, in which, in addition to the hose 14, a traction element 12 is used for extraction. If the tensile strength of the hose 14 alone is sufficient to extract the pipe 2 and if necessary to introduce the polyethylene pipe 16, then the traction element 12 can be omitted. In this way introduction of the hose 14 is simplified. The free end of the hose 14, introduced unpressurized into the pipe 2, is connected with the aid of a clamping device to a hydraulic or pneumatic traction cable winch. The hose is then provided hydraulically or pneumatically with an internal pressure, so that by means of elastic transverse expansion it is applied entirely against the inner wall of the pipe 2 and due to the applied pressure positive and frictional connection is produced. Then, with the end of the cable winch, the necessary tension for extracting the hose 14 and the pipe 2 is applied and these are wound in common on to the drum of the cable winch.

It is also possible to extract pipes consisting of materials other than lead by the method according to the invention. Furthermore, instead of a traction cable, a traction chain or traction rod can be used. In addition, a gas, preferably air, can be used to exert the pressure in the hose.

What is claimed is:

1. A method of extracting a hollow member laid in the earth, the hollow member being accessible at both a first end and a second end, characterized by: providing a hose having an extensibility in the longitudinal direction which is greater than the extensibility of the hollow members; introducing the hose in an unpressurized state into the hollow member over at least a portion of the length of the hollow member; pressurizing the hose internally such that the hose presses against an internal wall of the hollow member; maintaining the internal pressure of the hose; and extracting the hollow member from the earth in the longitudinal direction of the hollow member by means of a positive frictional connection between the hose and the internal wall of the hollow member.

2. A method of extracting a hollow member laid in the earth, the hollow member being accessible at both a first end and a second end characterized by: providing a traction element and a hose, together having an extensibility in the longitudinal direction which is greater than the extensibility of the hollow member; introducing the hose in an unpressurized state and the traction element into the hollow member over at least a portion of the length of the hollow member; pressurizing the hose such that at least the traction element presses against an internal wall of the hollow member; maintaining the internal pressure of the hose; and extracting the hollow member from the earth in the longitudinal direction of the hollow member by means of a positive frictional connection between the traction element and the internal wall of the hollow member.

3. A method of extracting a hollow member laid in the earth, the hollow member being accessible at both a first end and a second end, characterized by providing a hose having in the longitudinal direction a plurality of spaced apart sections whose extensibility in the longitudinal direction is greater than the extensibility of the hollow member; introducing the hose in an unpressurized state into the hollow member over at least a portion of the length of the hollow member; pressurizing the hose such that the hose presses against an internal wall of the hollow member; maintaining the internal pressure of the hose; and extracting the hollow member from the earth in the longitudinal direction of the hollow member by means of a positive frictional connection between the hose and the internal wall of the hollow member.

4. A method of extracting c hollow member laid in the earth, the hollow member being accessible at both a first end and a second end, characterized by: providing a hose and a traction element; introducing the hose in an unpressurized state and the traction element into the hollow member over at least a portion of the hollow member; pressurizing the hose such that the traction element presses against an internal wall of the hollow member; maintaining the internal pressure of the hose; coupling, behind the second end of the hollow member, in the direction of traction a second hollow member; extracting the hollow member from the earth in the longitudinal direction of the hollow member by means of a positive frictional connection between the traction element and the internal wall of the hollow member; and drawing into the earth the second hollow member simultaneously with extracting the hollow member.

5. The method according to claim 4, wherein the step of coupling the second hollow member to the traction element is accomplished by an adapter.

6. The method according to claim 5, further including the step of disposing an expander head between the adapter and the hollow member.

7. The method according to claim 5, wherein the step of coupling together the hose and pull-in cable by an adapter expands an interior of the hollow member and smooths the internal wall of the hollow member.

8. The method according to claim 5, wherein the step of coupling together the hose and pull-in cable by an adapter calibrates an interior of the hollow member and smooths the internal wall of the hollow member.

9. The method according to claim 4, further including the steps of mechanically splitting and separating a withdrawn portion of the hollow member from the hose during the extracting procedure.

10. The method according to claim 4, wherein the second hollow member is a polyethylene tube.

11. A method of extracting a hollow member laid in the earth, the hollow member being accessible at both a first end and a second end, characterized by: providing a hose having at least one end and a pull-in cable having at east one end; introducing the hose in an unpressurized state into the hollow member over at least a portion of the length of the hollow member by the pull-in cable; pressurizing the hose such that the hose presses against an internal wall of the hollow member; maintaining the internal pressure of the hose; extracting the hollow member from the earth in the longitudinal direction of the hollow member by means of a and positive frictional connection between the hose and the internal wall of the hollow member.

12. The method according to claim 11, further including coupling together on e end of the hose, and one end of the pull-in cable by an adapter.

13. The method according to claim 11, further including the steps of passing a reamer through the hollow member prior to introducing the hose; attaching the pull-in cable to the reamer; and drawing the pull-in cable and reamer through the hollow member.

14. A method of extracting a hollow member laid in the earth, the hollow member being accessible at both a first end and a second end, characterized by: providing a chain traction element and a hose; introducing the chain traction element and the hose in an unpressurized state into the hollow member over at least a portion of the length of the hollow member; pressurizing the hose such that the traction element presses against an internal wall of the hollow member; maintaining the internal pressure of the hose; extracting the hollow member from the earth in the longitudinal direction of the hollow member by means of a positive frictional connection between the traction element and the internal wall of the hollow member.

* * * * *